(12) United States Patent
Terasaka

(10) Patent No.: US 11,654,562 B2
(45) Date of Patent: May 23, 2023

(54) APPARATUS, ROBOT CONTROL DEVICE, ROBOT SYSTEM, AND METHOD OF SETTING ROBOT COORDINATE SYSTEM

(71) Applicant: FANUC CORPORATION, Yamanashi (JP)

(72) Inventor: Junya Terasaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 282 days.

(21) Appl. No.: 16/927,991

(22) Filed: Jul. 14, 2020

(65) Prior Publication Data

US 2021/0031369 A1  Feb. 4, 2021

(30) Foreign Application Priority Data

Jul. 31, 2019  (JP) .............................. JP2019-141675

(51) Int. Cl.
*B25J 5/02* (2006.01)
*B25J 9/16* (2006.01)
*B25J 9/00* (2006.01)
*B23B 25/06* (2006.01)

(52) U.S. Cl.
CPC .............. *B25J 9/1669* (2013.01); *B25J 5/02* (2013.01); *B25J 9/0018* (2013.01); *B25J 9/1682* (2013.01); *B25J 9/1692* (2013.01); *B23B 25/06* (2013.01)

(58) Field of Classification Search
CPC ...... B25J 9/1615; B25J 9/1638; B25J 9/1641; B25J 9/1682; B25J 9/1669; B25J 9/1692; B23B 25/06; Y10T 83/0448

USPC ............................................ 700/251; 702/85
See application file for complete search history.

(56) References Cited

U.S. PATENT DOCUMENTS

| 2014/0012416 A1* | 1/2014 | Negishi ................. B25J 9/1607 700/251 |
| 2020/0016759 A1* | 1/2020 | Kim ....................... B25J 9/1697 |
| 2020/0254612 A1* | 8/2020 | Keshmiri ................ B25J 9/161 |

FOREIGN PATENT DOCUMENTS

| JP | S59167685 U | 11/1984 | |
| WO | WO-03035332 A1 * | 5/2003 | ............ B25J 9/1692 |

* cited by examiner

*Primary Examiner* — Dalena Tran
(74) *Attorney, Agent, or Firm* — Hauptman Ham, LLP

(57) ABSTRACT

An apparatus capable of accurately determining a robot coordinate system of a robot configured to be moved along an axis. The apparatus of setting the robot coordinate system of the robot configured to be moved along a first axis includes a coordinate system acquisition section configured to determine, from positions of two robot coordinate systems preset along the first axis, a position of another robot coordinate system to be set between the positions of the two robot coordinate systems by calculation. Further, a method of setting a robot coordinate system of a robot configured to be moved along a first axis includes determining, from positions of two robot coordinate systems preset along the first axis, a position of another robot coordinate system to be set between the positions of the two robot coordinate systems by calculation.

7 Claims, 8 Drawing Sheets

APPARATUS, ROBOT CONTROL DEVICE, ROBOT SYSTEM, AND METHOD OF SETTING ROBOT COORDINATE SYSTEM

RELATED APPLICATIONS

The present application claims priority to Japanese Application Number 2019-141675, filed Jul. 31, 2019, the disclosure of which is hereby incorporated by reference herein in its entirety.

BACKGROUND OF THE INVENTION

1. Field of the Invention

The present invention relates to an apparatus, a robot control device, a robot system, and a method of setting a robot coordinate system.

2. Description of the Related Art

An apparatus configured to teach an operation to a robot has been known (e.g., JP 59-167685 Y). In the related art, there has been a demand for a technique that can accurately determine a robot coordinate system of a robot configured to be moved along an axis.

SUMMARY OF THE INVENTION

In an aspect of the present disclosure, an apparatus configured to set a robot coordinate system for a robot moved along a first axis includes a coordinate system acquisition section configured to obtain by calculation, from positions of two robot coordinate systems preset along the first axis, a position of another robot coordinate system to be set between the positions of the two robot coordinate systems.

In another aspect of the present disclosure, a method of setting a robot coordinate system for a robot moved along a first axis includes obtaining by calculation, from positions of two robot coordinate systems preset along the first axis, a position of another robot coordinate system to be set between the positions of the two robot coordinate systems.

According to the present disclosure, even when the axis along which the robot is moved deforms, the position of the other robot coordinate system that is set between the preset two robot coordinate systems can be accurately obtained so as to correspond to the deformation of the axis.

DETAILED DESCRIPTION

Figure 1:
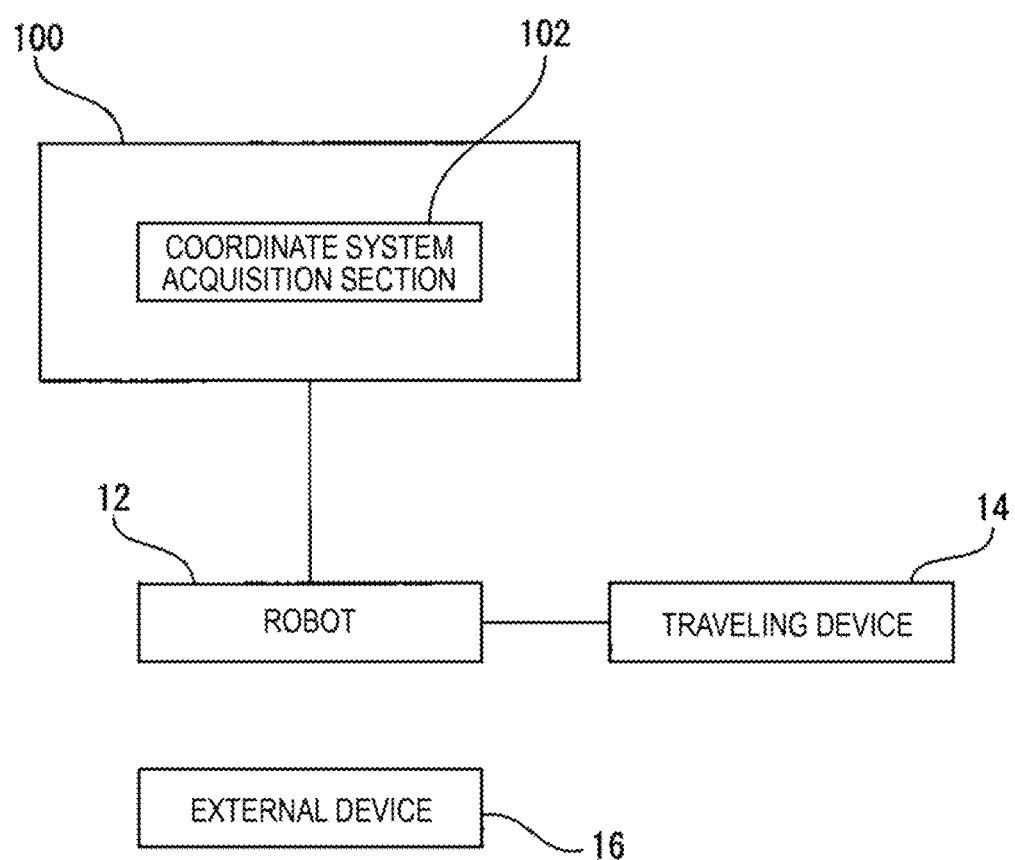
FIG. 1 is a block diagram of a robot system according to an embodiment.

Hereinafter, embodiments of the present disclosure will be described in detail with reference to the drawings. Note that, in the various embodiments to be described below, similar components are denoted by the same reference numerals, and redundant description thereof will be omitted. Further, in the following description, the upper, lower, left, and right in the drawing may be referred to as the upper (top), lower (bottom), left, and right. First, a robot system 10 according to an embodiment will be described with reference to FIG. 1 to FIG. 3. The robot system 10 includes a robot 12, a traveling device 14, an external device 16, and an apparatus 100.

Figure 2:
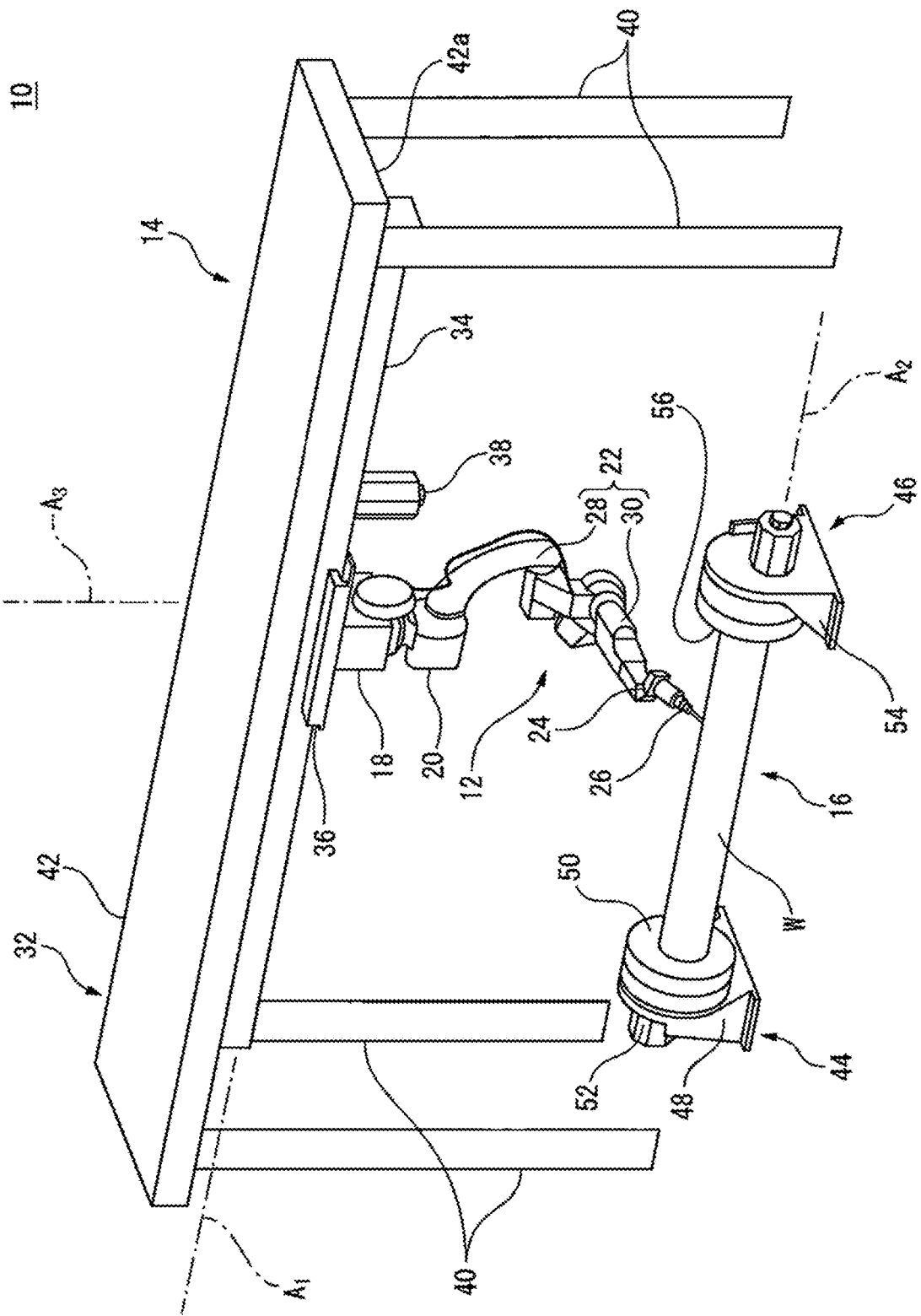
FIG. 2 is a perspective view of a robot, a traveling device, and an external device illustrated in FIG. 1.

With reference to FIG. 2, the robot 12 is moved along an axis $A_1$ (first axis) by the traveling device 14. In the present embodiment, the axis $A_1$ is a straight line. The robot 12 is an articulated robot, and includes a base 18, a turning body 20, a robot arm 22, a wrist 24, and an end effector 26. The turning body 20 is provided at the base 18 so as to be rotatable about an axis $A_3$. The axis $A_3$ is substantially parallel to a vertical direction (or substantially orthogonal to the axis $A_1$).

The robot arm 22 includes a first arm 28 rotatably provided at the turning body 20 and a second arm 30 rotatably provided at a distal end of the first arm 28. The wrist 24 is rotatably provided at a distal end of the second arm 30. The end effector 26 is removably attached to a distal end of the wrist 24, wherein the wrist 24 rotatably supports the end effector 26. The end effector 26 is e.g. a welding torch, a robot hand, a laser processing head, or a coating material applicator, and configured to perform a predetermined work (welding, work-handling, laser machining, or coating) on a workpiece W.

Servomotors (not illustrated) are built in the respective components of the robot 12 (i.e., the base 18, the turning body 20, the robot arm 22, and the wrist 24), and these servomotors rotationally drives the movable components of the robot 12 (i.e., the turning body 20, the robot arm 22, and the wrist 24) about drive shafts so as to move the end effector 26.

The traveling device 14 is configured to move the robot 12 along the axis $A_1$. Specifically, the traveling device 14 includes a support frame 32, a rail 34, a slider 36, and a drive section 38. The support frame 32 includes a plurality of columns 40 extending in the vertical direction, and a top wall 42 fixedly provided at upper ends of the columns 40.

The rail 34 is fixedly provided on a bottom surface 42a of the top wall 42, and extends linearly along the axis $A_1$. The slider 36 engages with the rail 34 so as to be slidable along the axis $A_1$. The slider 36 is guided to reciprocate along the axis $A_1$ by the engagement with the rail 34.

The drive section 38 is e.g. a servomotor, and generates power to move the slider 36 along the axis $A_1$.

The drive section 38 rotates a timing belt (not illustrated) laid along the rail 34, wherein the timing belt engages with an upper portion of the slider 36 and transfers the power generated by the drive section 38 to the slider 36.

The base 18 of the robot 12 is fixed on a lower surface of the slider 36. When the drive section 38 rotates the timing belt, the slider 36 engaging with the timing belt is moved along the axis $A_1$, whereby the robot 12 mounted on the slider 36 is moved along the axis $A_1$.

The external device 16 is installed outside the robot 12, and rotates the workpiece W to be worked by the robot 12 about an axis $A_2$ (second axis). Specifically, the external device 16 includes a driving device 44 and a driven device 46. The driving device 44 includes a base 48, an output flange 50, and a drive section 52. The base 48 is secured on a floor of a work cell. The output flange 50 is a circular disk-shaped member, and provided at the base 48 to as to be rotatable about the axis $A_2$. The drive section 52 is e.g. a servomotor, and generates power to rotate the output flange 50.

The driven device 46 includes a base 54 and a driven flange 56. The base 54 is secured on the floor of the work cell, and disposed opposite to the base 48 of the driving device 44. The driven flange 56 is a circular disk-shaped member disposed concentrically with the output flange 50 with respect to the axis $A_2$, and provided at the base 54 so as to be rotatable about the axis $A_2$.

The workpiece W is secured to the output flange 50 and the driven flange 56 by a jig (not illustrated). When the drive section 52 rotates the output flange 50, the workpiece W is rotated together with the output flange 50, and the driven flange 56 is also rotated about the axis $A_2$ in response to the rotation of the workpiece W. In the present embodiment, the axis $A_1$ and the axis $A_2$ are substantially parallel to each other.

Figure 3:
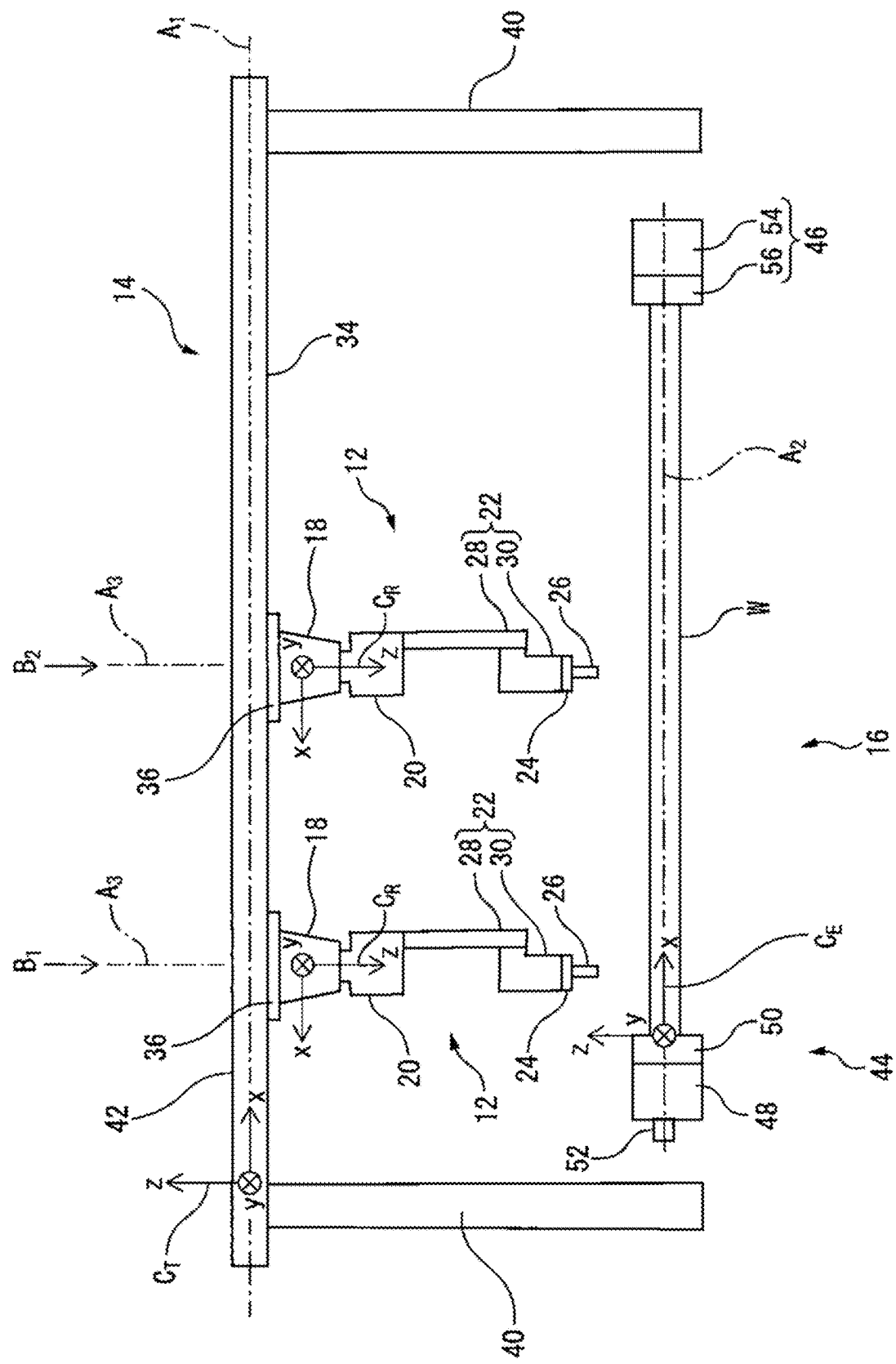
FIG. 3 is a schematic view of the robot, the traveling device, and the external device illustrated in FIG. 2, and illustrates various coordinate systems and operation axes.

As illustrated in FIG. 3, a traveling device coordinate system $C_T$ is set for the traveling device 14. The traveling device coordinate system $C_T$ is for automatically controlling an operation of the traveling device 14, and is a fixed-coordinate system fixedly set in a three-dimensional space. In the present embodiment, the traveling device coordinate system $C_T$ is set such that its origin is positioned at a left end of the rail 34, its x-axis direction coincides with the axis $A_1$, and its z-axis direction is parallel to a vertical direction.

An external device coordinate system $C_E$ is set for the external device 16. The external device coordinate system $C_E$ is for automatically controlling an operation of the external device 16, and is a fixed-coordinate system fixedly set in a three-dimensional space. In the present embodiment, the external device coordinate system $C_E$ is set such that its origin is positioned at a center of the output flange 50 and its x-axis direction coincides with the axis $A_2$.

On the other hand, a robot coordinate system $C_R$ is set for the robot 12. The robot coordinate system $C_R$ is for automatically controlling the movable components of the robot 12, and is a moving-coordinate system that moves together with the slider 36 of the traveling device 14 in a three-dimensional space. In the present embodiment, the robot coordinate system $C_R$ is set such that its origin is positioned at a center of the base 18 and its z-axis direction coincides with the axis $A_3$.

When the work is performed on the workpiece W by the robot 12, the traveling device 14 sequentially disposes the robot 12 at predetermined work positions $B_1$ and $B_2$. These work positions $B_1$ and $B_2$ can be defined as positions in the direction of the axis $A_1$ (i.e., x-coordinates of the traveling device coordinate system $C_T$). At this time, the robot coordinate system $C_R$ is sequentially set at the work positions $B_1$ and $B_2$, and in cooperation with an operation in which the external device 16 rotates the workpiece W about the axis $A_2$, the robot 12 is controlled with reference to the robot coordinate system $C_R$ so as to sequentially perform the work on the workpiece W at each of the work positions $B_1$ and $B_2$.

Figure 4:
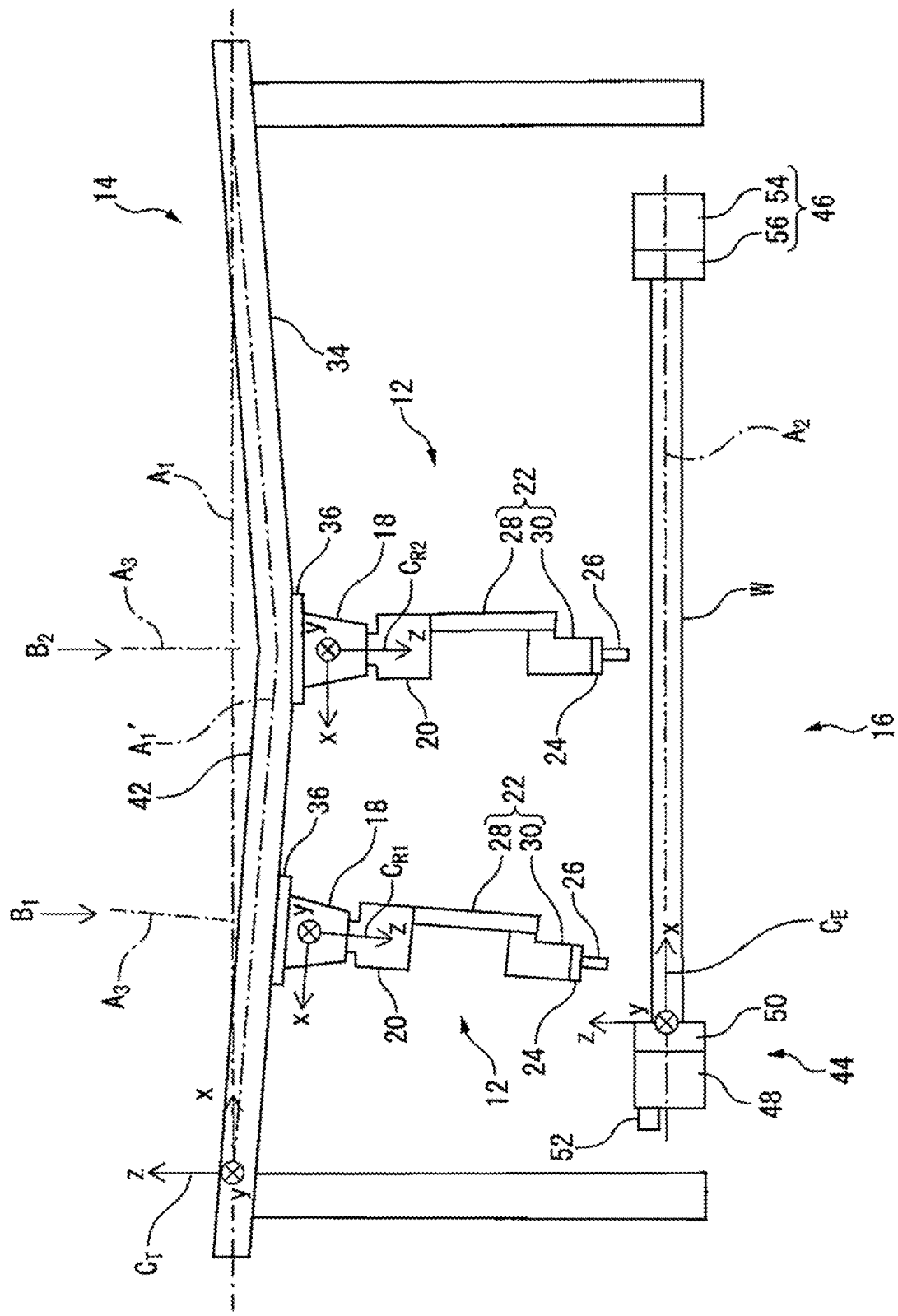
FIG. 4 illustrates a state in which a rail section illustrated in FIG. 3 deforms.

In this regard, the rail 34 of the traveling device 14 may deform due to a factor such as gravity. An example in which such deformation occurs in the rail 34 is illustrated in FIG. 4. In the example illustrated in FIG. 4, the top wall 42 and the rail 34 are bent downward at a center portion thereof. In this case, the actual axis $A_1'$ of the rail 34 does not coincide with the designed axis $A_1$ (the x-axis of the traveling device coordinate system $C_T$).

In this case, positions and orientations of the base 18 of the robot 12 when the robot 12 is disposed at the work positions $B_1$ and $B_2$ by the traveling device 14 may be different from the designed positions and orientations illustrated in FIG. 3. If the rail 34 deforms in this way, it is necessary to set the robot coordinate system $C_R$ at the work positions $B_1$ and $B_2$ so as to take deviation of the actual axis $A_1'$ from the designed axis $A^1$ into account.

In the present embodiment, robot coordinate systems $C_{R1}$ and $C_{R2}$ are preset at the respective two work positions $B_1$ and $B_1$ illustrated in FIG. 4. Hereinafter, a method of setting a robot coordinate system will be described. First, the traveling device 14 disposes the robot 12 at the work position $B_1$. Then, the robot 12 touches up three points defined on the workpiece W (or a dummy workpiece) by the end effector 26 while the external device 16 is rotating the workpiece W.

From position data of the robot 12 at this time and information indicating positions of the three points defined on the workpiece W, it is possible to acquire data indicating a relative position between the robot 12 (specifically, the base 18) disposed at the work position $B_1$ and the external device 16. The position data of the robot 12 includes e.g. a rotation angle of each servomotor built in the robot 12, and the rotation angle can be detected by a rotation detector (encoder or Hall element) provided at the servomotor.

As an example, a position and a direction of the axis $A_2$ of the external device 16 with respect to the robot 12 (base 18) are acquired as the relative position data between the robot 12 disposed at the work position $B_1$ and the external device 16. Based on the relative position data, an origin position (i.e., the center of the base 18) and directions of respective axes of the robot coordinate system $C_{R1}$ to be set at the work position $B_1$ are determined. In this way, it is possible to set the robot coordinate system $C_{R1}$ at the work position $B_1$ as illustrated in FIG. 4.

Similarly, the traveling device 14 disposes the robot 12 at the work position $B_2$, and then, the robot 12 touches up three points defined on the workpiece W by the end effector 26 while the external device 16 is rotating the workpiece W, whereby, data indicating a relative position between the robot 12 (base 18) disposed at the work position $B_2$ and the external device 16 (e.g., a position and a direction of the axis $A_2$ with respect to the robot 12 disposed at the work position $B_2$) is acquired.

Based on the relative position data, the robot coordinate system $C_{R2}$ can be set at the work position $B_2$ as illustrated in FIG. 4. By the above-described method of setting the robot coordinate system, the robot coordinate systems $C_{R1}$ and $C_{R2}$ are preliminarily set, and the setting information of positions (origin positions) and orientations (directions of respective axes) of the respective robot coordinate systems $C_{R1}$ and $C_{R2}$ are stored in a memory (not illustrated).

If a further work position $B_3$ is set between the work positions $B_1$ and $B_2$, the apparatus 100 according to the present embodiment automatically sets another robot coordinate system $C_{R3}$ at the work position $B_3$. Specifically, as illustrated in FIG. 1, the apparatus 100 includes a coordinate system acquisition section 102. The coordinate system acquisition section 102 obtains, by calculation, a position of another coordinate system $C_{R3}$ to be set at the work position $B_3$, from the positions of the two robot coordinate systems $C_{R1}$ and $C_{R2}$ preset by the above-described method of setting the robot coordinate system.

Hereinafter, a function of the coordinate system acquisition section 102 will be described with reference to FIG. 5. First, an operator inputs position information of the work position $B_3$. For example, the operator inputs the position information of the work position $B_3$ as an x-coordinate of the traveling device coordinate system $C_T$. The coordinate system acquisition section 102 obtains the position of the robot coordinate system $C_{R3}$ to be set at the work position $B_3$ as a position on a virtual straight line $A_4$ that connects the position (origin) of the robot coordinate system $C_{R1}$ and the position (origin) of the robot coordinate system $C_{R2}$.

Specifically, the coordinate system acquisition section 102 obtains, by calculation, coordinates (or functions) of the virtual straight line $A_4$ in the traveling device coordinate system $C_T$ (so-called linear interpolation between two points). Then, the coordinate system acquisition section 102 obtains, by calculation, the coordinates in the traveling device coordinate system $C_T$ of a point $P_1$ on the virtual straight line $A_4$ at the work position $B_3$. In this way, the coordinate system acquisition section 102 can obtain, by the calculation, the position $P_1$ of the origin of the robot coordinate system $C_{R3}$ to be set at the work position $B_3$.

Next, the coordinate system acquisition section 102 obtains an orientation of the robot coordinate system $C_{R3}$ to be set at the work position $B_3$. In the example illustrated in FIG. 5, the coordinate system acquisition section 102 obtains, by calculation, the orientation of the robot coordinate system $C_{R3}$ as an intermediate orientation between the orientation of the robot coordinate system $C_{R1}$ and the orientation of the robot coordinate system $C_{R2}$.

An example of a method of obtaining the orientation of the robot coordinate system $C_{R3}$ will be described below with reference to FIG. 5 and FIG. 6. In the traveling device coordinate system $C_T$, the coordinate system acquisition section 102 calculates an intermediate direction between the z-axis direction of the robot coordinate system $C_{R1}$ and the z-axis direction of the robot coordinate system $C_{R2}$, and decides the calculated direction as a z-axis direction of the robot coordinate system $C_{R3}$.

Figure 6:
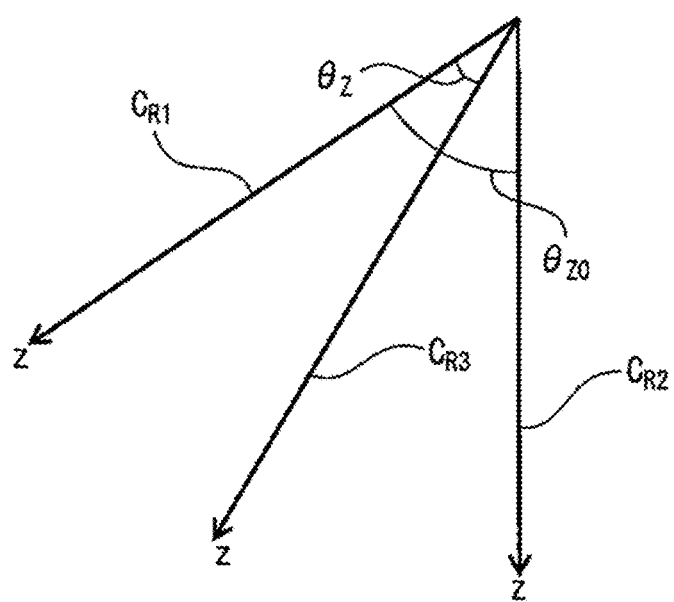
FIG. 6 is a diagram illustrating a method of determining an orientation of the other robot coordinate system illustrated in FIG. 5.

As illustrated in FIG. 6, assume that the origins of the z-axes of the robot coordinate systems $C_{R1}$, $C_{R2}$ and $C_{R3}$ are arranged to coincide with each other, an angle between the z-axis direction of the robot coordinate system $C_{R1}$ and the z-axis direction of the robot coordinate system $C_{R2}$ is defined as $\theta_{z0}$, and an angle between the z-axis direction of the robot coordinate system $C_{R1}$ and the z-axis direction of the robot coordinate system $C_{R3}$ is defined as $\theta_z$.

In this case, the intermediate direction between the z-axis direction of the robot coordinate system $C_{R1}$ and the z-axis direction of the robot coordinate system $C_{R2}$ can be defined as a direction in which $\theta_z = \theta_{z0}/2$ is satisfied on the same plane as the z-axes of the robot coordinate systems $C_{R1}$ and $C_{R2}$. Thus, in this case, as illustrated in FIG. 6, the z-axis of the robot coordinate system $C_{R3}$ is decided as the direction inclined by the angle $\theta_z = \theta_{z0}/2$ from the z-axis direction of the robot coordinate system $C_{R1}$ toward the z-axis direction of the robot coordinate system $C_{R2}$ on the same plane as the z-axes of the robot coordinate systems $C_{R1}$ and $C_{R2}$.

Similarly, in the traveling device coordinate system $C_T$, the coordinate system acquisition section 102 calculates an intermediate direction between the x-axis (or y-axis) direction of the robot coordinate system $C_{R1}$ and the x-axis (or y-axis) direction of the robot coordinate system $C_{R2}$, and decides the calculated direction as the x-axis (or y-axis) direction of the robot coordinate system $C_{R3}$. In this way, the coordinate system acquisition section 102 can obtain the orientation (directions of respective axes) of the robot coordinate system $C_{R3}$ as the intermediate orientation between the orientations of the robot coordinate systems $C_{R1}$ and $C_{R2}$.

Alternatively, the coordinate system acquisition section 102 may obtain the orientation of the robot coordinate system $C_{R3}$ as a function based on the orientations of the robot coordinate systems $C_{R1}$ and $C_{R2}$, and on the position of the point $P_1$. Specifically, the z-axis direction of the robot coordinate system $C_{R3}$ can be expressed as a function: $\theta_z = f_z(x)$ where the angle $\theta_z$ illustrated in FIG. 6 changes depending on the x-coordinate of the traveling device coordinate system $C_T$ (e.g., increases with the x-coordinate of the traveling device coordinate system $C_T$) within a range of $0 \leq \theta_z \leq \theta_{z0}$. Accordingly, the coordinate system acquisition section 102 can obtain, by calculation, the z-axis direction of the robot coordinate system $C_{R3}$ to be set at the work position $B_3$, using the x-coordinate of the traveling device coordinate system $C_T$ at the work position $B_3$ and the function: $\theta_z = f_z(x)$.

Similarly, the x-axis (or y-axis) direction of the robot coordinate system $C_{R3}$ can be expressed as a function: $\theta_x = f_x(x)$ (or $\theta_y = f_y(x)$) that changes depending on the x-coordinate of the traveling device coordinate system $C_T$. Accordingly, the coordinate system acquisition section 102 can obtain, by calculation, the x-axis (or y-axis) direction of the robot coordinate system $C_{R3}$ from the x-coordinate in the traveling device coordinate system $C_T$ at the work position $B_3$ and the function: $\theta_x = f_x(x)$ (or the function $\theta_y = f_y(x)$).

In this way, the coordinate system acquisition section 102 can obtain the orientation of the robot coordinate system $C_{R3}$ by calculation, using the functions $f_z(x)$, $f_x(x)$, or $f_y(x)$. The parameter such as a coefficient or variable in the function $f_z(x)$, $f_x(x)$, or $f_y(x)$ can be determined by the operator.

By the method described above, the coordinate system acquisition section 102 can automatically set the robot coordinate system $C_{R3}$ at the work position $B_3$ with the orientation at the position $P_1$ obtained by the calculation. Note that, the coordinate system acquisition section 102 may set the robot coordinate system $C_{R3}$ at the point $P_1$ with a predetermined orientation, without calculating the orientation of the robot coordinate system $C_{R3}$. For example, the coordinate system acquisition section 102 may set the robot coordinate system $C_{R3}$ at the point $P_1$ with the same orientation as the robot coordinate system $C_{R1}$ or $C_{R2}$.

Figure 5:
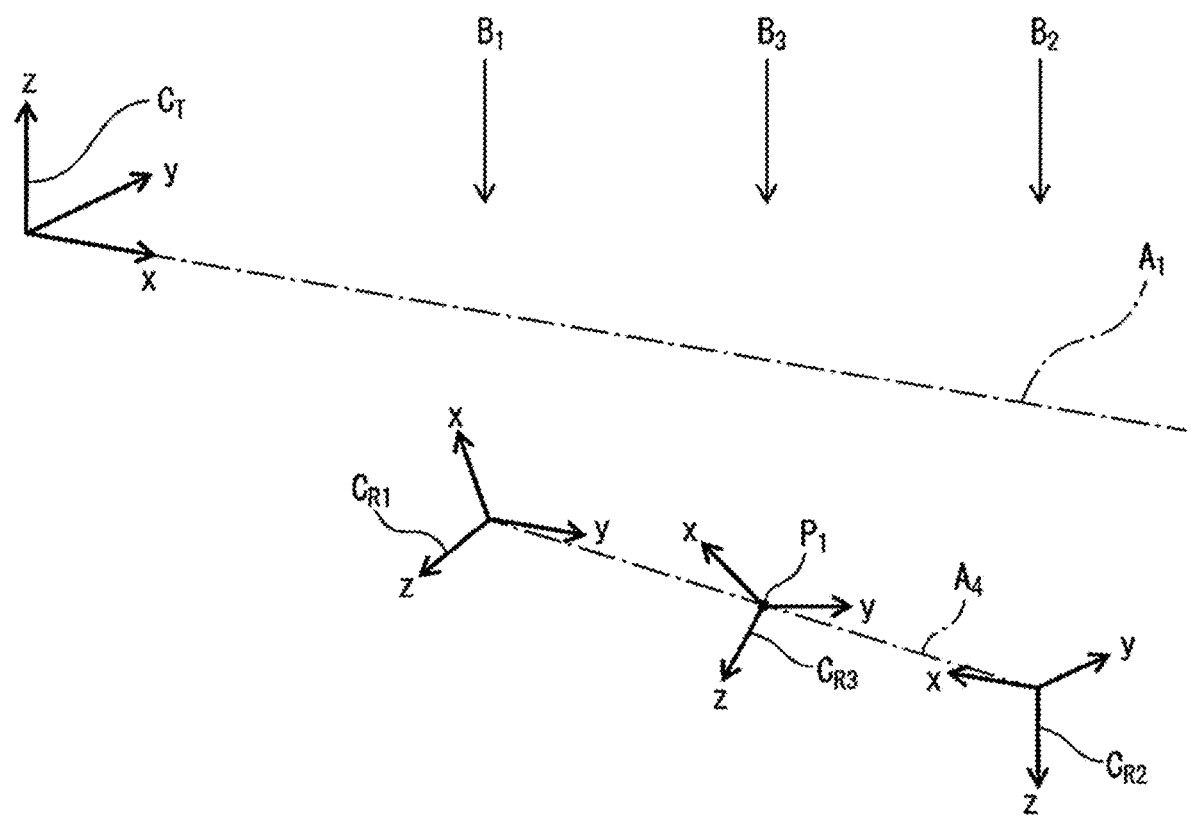
FIG. 5 is a diagram illustrating a method of setting another robot coordinate system between two robot coordinate systems.
Figure 7:
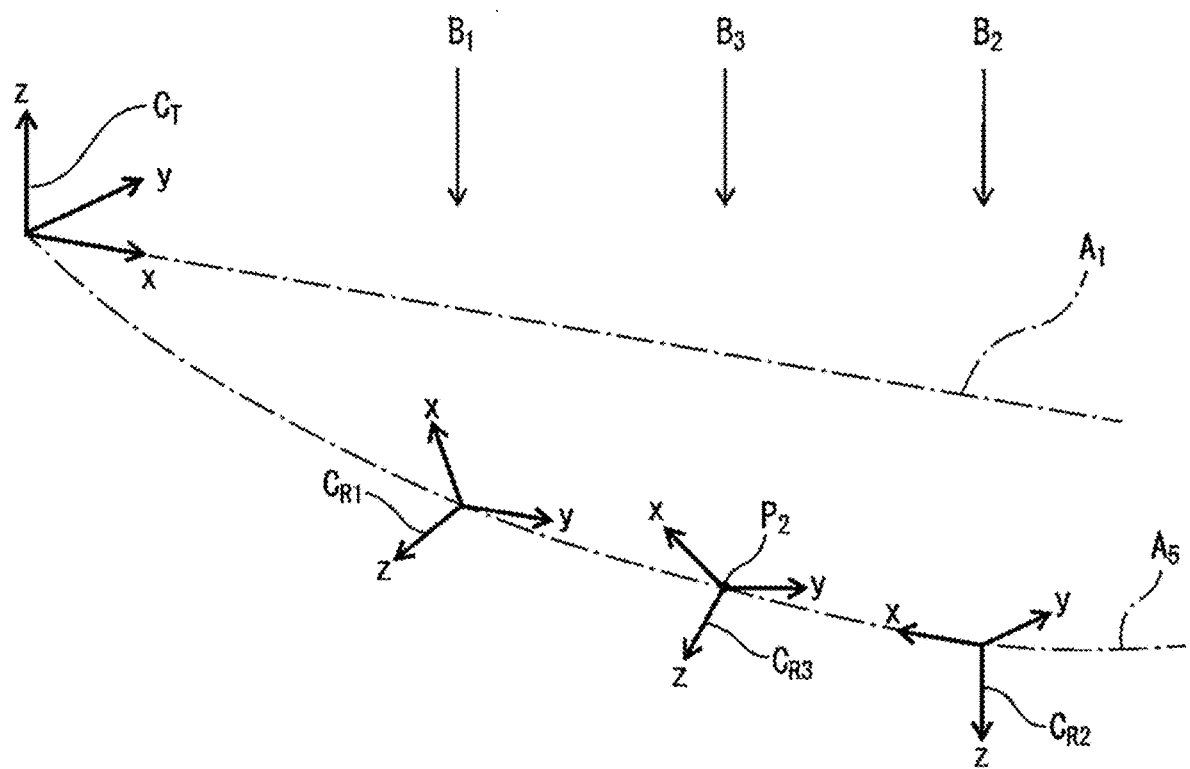
FIG. 7 is a diagram illustrating another method of setting another robot coordinate system between two robot coordinate systems.

In the example illustrated in FIG. 5, the coordinate system acquisition section 102 obtains the position $P_1$ of the robot coordinate system $C_{R3}$ as a position on the virtual straight line $A_4$. However, the position $P_1$ may be obtained as a position on a curved line. Such an embodiment will be described with reference to FIG. 7. In the present embodiment, the coordinate system acquisition section 102 obtains the position of the robot coordinate system $C_{R3}$ to be set at the work position $B_3$ as a position on a virtual curved line $A_5$.

For example, the virtual curved line $A_5$ may be a curved line connecting both ends of the rail 34 (or both ends of the movement stroke of the slider 36) and the origins of the robot coordinate systems $C_{R1}$ and $C_{R2}$, and may be comprised of a parabolic line, an arc line, arbitrary curved line, or a combination thereof. The coordinate system acquisition section 102 obtains, by calculation, coordinates (or function) of the virtual curved line $A_5$ in the traveling device coordinate system $C_T$ (so-called a curved line (or parabolic line or arc) interpolation between a plurality of points).

Then, the coordinate system acquisition section 102 obtains, by calculation, coordinates in the traveling device coordinate system $C_T$ of a point $P_2$ on the virtual curved line $A_5$ at the work position $B_3$. In this way, the coordinate system acquisition section 102 can obtain, by calculation, the position $P_2$ of the origin of the robot coordinate system $C_{R3}$ to be set at the work position $B_3$.

In addition, the coordinate system acquisition section 102 can obtain the orientation of the robot coordinate system $C_{R3}$ by the above-described method.

The apparatus 100 having the above-described function is comprised of a computer including a processor (CPU, GPU, or the like) and a memory (ROM, RAM, or the like), for example. In this case, the processor of the computer performs various calculations to carry out the function of the coordinate system acquisition section 102. Note that the apparatus 100 may be a robot controller configured to control the robot 12.

As described above, the coordinate system acquisition section 102 of the apparatus 100 obtains, by calculation, the positions $P_1$, $P_2$ of the robot coordinate system $C_{R3}$ to be set between the positions of the two robot coordinate systems $C_{R1}$ and $C_{R2}$, from the positions of the two robot coordinate systems $C_{R1}$ and $C_{R2}$ preset along the axis $A_1$. According to this configuration, even when the rail 34 of the traveling device 14 deforms, it is possible to accurately and automatically obtain the position of the robot coordinate system $C_{R3}$ so as to correspond to the deformation of the rail 34.

Further, by controlling the robot 12 disposed at the work position $B_3$ with reference to the robot coordinate system $C_{R3}$, it is possible to carry out the more accurate cooperative operation between the robot 12 and the external device 16. In addition, since the operator does not need to manually obtain the position $P_1$, $P_2$ of the robot coordinate system $C_{R3}$, the burden necessary for the startup of the robot system 10 can be reduced.

In the above-described embodiment, the two robot coordinate systems $C_{R1}$ and $C_{R2}$ are preset along the axis $A_1$. However, the operator may preset the n-th robot coordinate system $C_{R\_n}$ (n=1, 2, 3 . . . ) along the axis $A_1$.

In this case, the coordinate system acquisition section 102 obtains, by calculation, a position $P_m$ of another robot coordinate system $C_{R\_n}$ to be set between two robot coordinate systems $C_{R\_n-1}$ and $C_{R\_n}$ adjacent to each other, from positions of the two robot coordinate systems $C_{R\_n-1}$ and $C_{R\_n}$, using the above-described method. By increasing the number of the preset robot coordinate systems $C_{R\_n}$ in this way, it is possible to obtain the position $P_m$ of the robot coordinate system $C_{R\_n}$ to be set between any two robot coordinate systems $C_{R\_n-1}$ and $C_{R\_n}$ so as to correspond to the deformation of the rail 34 with higher accuracy.

Figure 8:
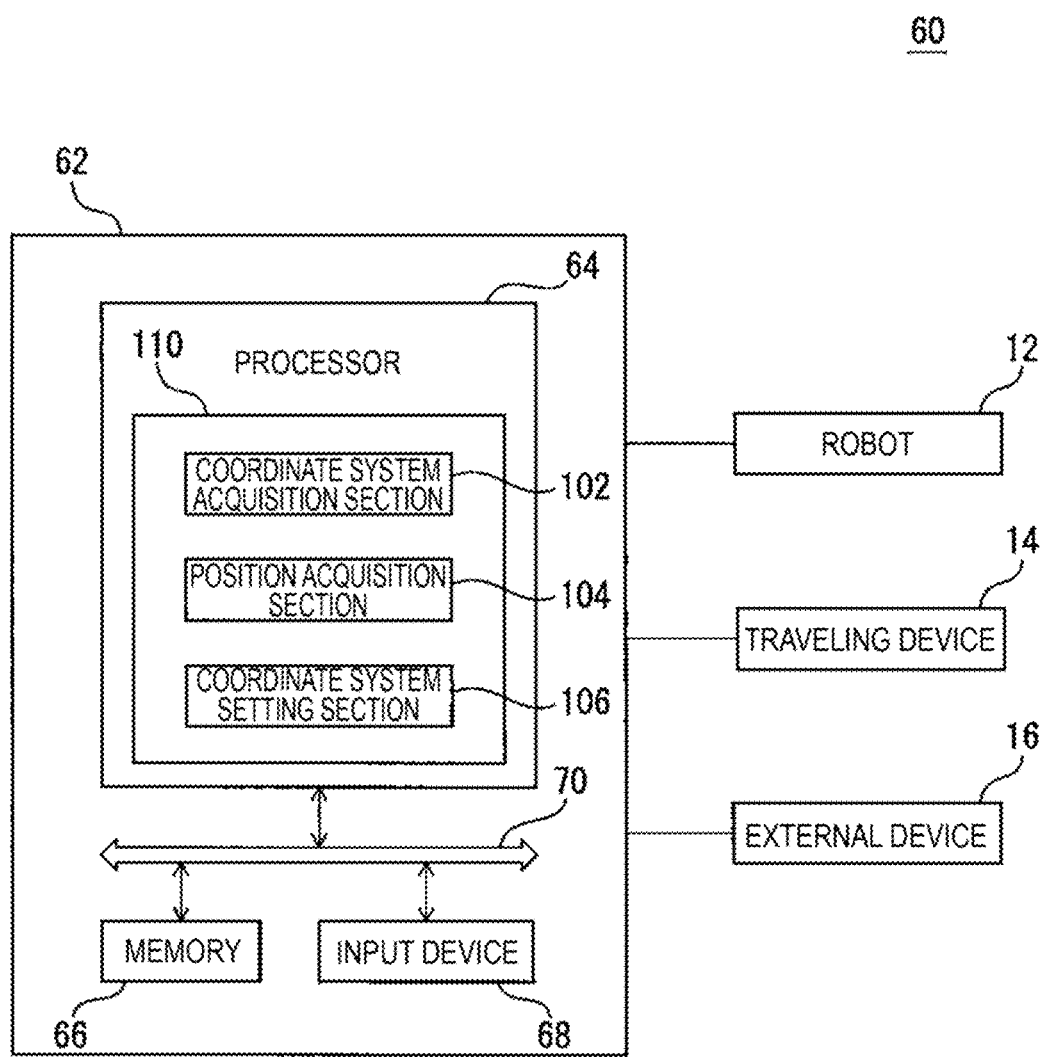
FIG. 8 is a block diagram of a robot system according to another embodiment.

Next, another robot system 60 will be described with reference to FIG. 8. The robot system 60 includes the robot 12, the traveling device 14, the external device 16, and a robot control device 62. The robot control device 62 controls operations of the robot 12, the traveling device 14, and the external device 16.

The robot control device 62 includes a processor 64, a memory 66, and an input device 68. The processor 64 includes e.g. a CPU or GPU, and is communicably connected to the memory 66 and the input device 68 via a bus 70. The processor 64 performs various calculations while communicating with the memory 66 and the input device 68. The memory 66 includes e.g. a ROM or RAM, and stores various types of data. The input device 68 includes e.g. a keyboard, a mouse, or a touch panel, and receives input of data from an operator.

The robot control device 62 includes an apparatus 110 configured to set the robot coordinate system $C_R$. In the present embodiment, a function of the apparatus 110 is implemented in the robot control device 62 as software or hardware, and the processor 64 performs various calculations for carrying out the function of the apparatus 110.

The function of the apparatus 110 will be described below. First, the processor 64 preliminarily sets n-th robot coordinate system $C_{R\_n}$ (n=1, 2, 3 . . . ) along the axis $A_1$. Specifically, the processor 64 controls the traveling device 14 so as to dispose the robot 12 at the n-th work position $B_n$.

Then, using the above-described method of setting the robot coordinate system, the processor 64 controls the robot 12 so as to touch up three points defined on the workpiece W by the end effector 26 along with controlling the external device 16 so as to rotate the workpiece W (or dummy workpiece), and acquires the data of the relative position between the robot 12 disposed at the n-th work position $B_n$ and the external device 16 (e.g., the data indicative of the position and the direction of the axis $A_2$ of the external device 16 with respect to the robot 12). Thus, the processor 64 functions as a position acquisition section 104 configured to acquire the relative position between the robot 12 and the external device 16.

Then, based on the acquired data of the relative position, the processor 64 determines the origin position (i.e., the center of the base 18) and the directions of respective axes of the n-th robot coordinate system $C_{R\_n}$ to be set at the n-th work position $B_n$. In this way, the processor 64 preliminarily sets the n-th robot coordinate system $C_{R\_n}$ at the n-th work position $B_n$.

Thus, the processor 64 functions as a coordinate system setting section 106 configured to preliminarily set the n-th robot coordinate system $C_{R\_n}$ based on the relative position. The processor 64 stores setting information (e.g., coordinates of the traveling device coordinate system $C_T$) of the position and the orientation of the n-th robot coordinate system $C_{R\_n}$ in the memory 66.

Thereafter, the operator optionally sets a further work position $B_m$ between the (n-1)-th work position $B_{n-1}$ and the n-th work position $B_n$ adjacent to each other, depending on e.g. the content of the work to be carried out on the workpiece W. Specifically, the operator operates the input device 68 so as to input position information of the work position $B_m$ as the x-coordinate of the traveling device coordinate system $C_T$, for example.

When receiving the input of the position information of the work position $B_m$, the processor 64 functions as the coordinate system acquisition section 102 to obtain a position $P_m$ and an orientation of another robot coordinate system $C_{R\_m}$ to be set between the (n-1)-th robot coordinate system $C_{R\_n-1}$ and the n-th robot coordinate system $C_{R\_n}$ from the setting information of the positions and orientations of the (n-1)-th robot coordinate system $C_{R\_n-1}$ and the n-th robot coordinate system $C_{R\_n}$ which are preset, using the method described above with reference to FIG. 5 to FIG. 7.

When disposing the robot 12 at the work position $B_m$ and performing the work on the workpiece W by the robot 12, the processor 64 controls the traveling device 14 so as to dispose the robot 12 at the work position $B_m$, and sets the robot coordinate system $C_{R\_n}$ at the position $P_m$ and the orientation, that have been obtained as described above, in the work position $B_m$.

Then, the processor 64 controls the robot 12 with reference to the robot coordinate system $C_{R\_m}$, and performs the work on the workpiece W by the robot 12, in cooperation with the rotating operation of the workpiece W by the external device 16. In this way, the processor 64 can sequentially perform the work on the workpiece W by the robot 12 at each of the n-th work position $B_n$ and the work position $B_m$.

According to the present embodiment, even when the rail 34 of the traveling device 14 deforms, the processor 64 can accurately and automatically obtain the position of the robot coordinate system $C_{R\_m}$ to be set at the work position $B_m$ so as to correspond to the deformation of the rail 34. Furthermore, by controlling the robot 12 disposed at the work position $B_m$ with reference to the robot coordinate system $C_{R\_m}$, it is possible to carry out the more accurate cooperative operation between the robot 12 and the external device 16. Furthermore, since the operator does not need to manually determine the position $P_m$ of the robot coordinate system $C_{R\_m}$, the burden necessary for the startup of the robot system 60 can be reduced.

In the above-described embodiments, the coordinates of the virtual straight line $A_4$, the virtual curved line $A_5$, the point $P_1$, and the point $P_2$ are obtained as the coordinates in the traveling device coordinate system $C_T$. However, they may be obtained as coordinates in the external device coordinate system $C_E$ or a world coordinate system (not illustrated), for example. The world coordinate system is a fixed coordinate system that is set different from the robot coordinate system $C_{R3}$, the traveling device coordinate system $C_T$, and the external device coordinate system $C_E$ in order to define a three-dimensional space of a work cell.

Further, in the above-described embodiments, the position information of the work position $B_3$, $B_m$ is input as the x-coordinate of the traveling device coordinate system $C_T$. However, the position information of the work position $B_3$, $B_m$ may be input as coordinate of the external device coordinate system $C_E$ or the world coordinate system (not illustrated), for example.

Further, the robot 12 is not limited to the articulated robot, but may be any other types of robots, such as a parallel link robot or the like. Further, the traveling device 14 may be any type of device as long as it can move the robot 12 along the axis $A_1$. Additionally, the axis $A_1$ is not limited to the straight line, but may be a curved line.

Although the present disclosure has been described through the above embodiments, the above embodiments are not intended to limit the claimed invention.

The invention claimed is:

1. An apparatus configured to set a robot coordinate system for a robot movable on a rail extending along a first axis, the apparatus comprising:
   a coordinate system acquisition section configured to obtain by calculation, from positions of two robot coordinate systems preset along the first axis, a position of another robot coordinate system to be set between the positions of the two robot coordinate systems,
   wherein the coordinate system acquisition section is configured to:
      determine a curved line connecting origins of the two robot coordinate systems, the curved line corresponding to a deformation of the rail, and
      obtain the position of an origin of said another robot coordinate system on the curved line.

2. The apparatus of claim 1, wherein
   the coordinate system acquisition section is further configured to obtain, by calculation, an orientation of said another robot coordinate system as an intermediate orientation between orientations of the two robot coordinate systems.

3. The apparatus of claim 1, further comprising:
   a position acquisition section configured to acquire a relative position between the robot and an external device installed outside the robot; and
   a coordinate system setting section configured to preliminarily set the two robot coordinate systems, respectively, based on the relative position,
   wherein the coordinate system acquisition section is configured to obtain the position of said another robot coordinate system from the positions of the two robot coordinate systems preset by the coordinate system setting section.

4. The apparatus of claim 3, wherein
   the external device is configured to rotate a workpiece to be worked on by the robot about a second axis, and
   the position acquisition section is configured to acquire, as the relative position, a position and a direction of the second axis with respect to the robot.

5. The apparatus of claim 1, being a robot control device configured to control the robot.

6. A robot system comprising:
   a robot movable on a rail extending along a first axis;
   an external device installed outside the robot and configured to rotate, about a second axis, a workpiece to be worked on by the robot; and
   a robot control device configured to control an operation of the robot to perform a work on the workpiece in cooperation with an operation of the external device to rotate the workpiece, wherein
   the robot control device comprises a coordinate system acquisition section configured to obtain by calculation, from positions of two robot coordinate systems preset along the first axis, a position of another robot coordinate system to be set between the positions of the two robot coordinate systems, and
   the coordinate system acquisition section is configured to:
      determine a curved line connecting origins of the two robot coordinate systems, the curved line corresponding to a deformation of the rail, and
      obtain the position of an origin of said another robot coordinate system on the curved line.

7. A method of setting a robot coordinate system for a robot movable on a rail extending along a first axis, the method comprising:
   obtaining by calculation, from positions of two robot coordinate systems preset along the first axis, a position of another robot coordinate system to be set between the positions of the two robot coordinate systems,
   wherein said obtaining comprises:
      determining a curved line connecting origins of the two robot coordinate systems, the curved line corresponding to a deformation of the rail, and
      obtaining the position of an origin of said another robot coordinate system on the curved line.

* * * * *